United States Patent
Karrasch et al.

(10) Patent No.: US 8,091,489 B2
(45) Date of Patent: Jan. 10, 2012

(54) CONNECTING DEVICE FOR FURNITURE

(75) Inventors: Thorsten Karrasch, Herford (DE); Michael Rene Amon, Petershagen (DE)

(73) Assignee: Hettich-Heinze GmbH & Co. KG, Spenge (DE)

(*) Notice: Subject to any disclaimer, the term of this patent is extended or adjusted under 35 U.S.C. 154(b) by 452 days.

(21) Appl. No.: 12/299,211

(22) PCT Filed: Apr. 18, 2007

(86) PCT No.: PCT/EP2007/053799
§ 371 (c)(1), (2), (4) Date: Jan. 13, 2009

(87) PCT Pub. No.: WO2007/128663
PCT Pub. Date: Nov. 15, 2007

(65) Prior Publication Data
US 2009/0183656 A1    Jul. 23, 2009

(30) Foreign Application Priority Data
May 5, 2006  (DE) .................... 20 2006 007 300 U

(51) Int. Cl.
*A47B 13/00* (2006.01)
(52) U.S. Cl. ..................... 108/153.1; 248/188
(58) Field of Classification Search .............. 108/157.1, 108/156, 27, 64, 153.1, 158.13, 157.14; 248/188, 248/188.1, 165
See application file for complete search history.

(56) References Cited

U.S. PATENT DOCUMENTS

| | | | | |
|---|---|---|---|---|
| 2,859,804 A | * | 11/1958 | Healy | 248/188 |
| 4,011,821 A | * | 3/1977 | Neal | 108/156 |
| 4,731,918 A | * | 3/1988 | Burghardt | 108/156 |
| 4,925,140 A | * | 5/1990 | Camarota | 248/188 |
| 5,002,247 A | * | 3/1991 | Dispenza et al. | 248/188 |
| 5,232,303 A | | 8/1993 | Rubner | |
| 5,528,996 A | * | 6/1996 | Edwards et al. | 108/64 |
| 5,934,630 A | * | 8/1999 | Williams et al. | 248/188 |
| 5,934,639 A | | 8/1999 | Chiang et al. | |
| 5,947,037 A | * | 9/1999 | Hornberger et al. | 108/153.1 |
| 6,318,276 B1 | * | 11/2001 | Reinecke | 108/159.11 |
| 6,547,196 B2 | * | 4/2003 | Binnebose et al. | 248/188 |
| 6,659,410 B1 | * | 12/2003 | Lu | 248/188 |
| 6,776,106 B2 | * | 8/2004 | Lin | 108/157.1 |
| 7,472,655 B2 | * | 1/2009 | Leng | 108/27 |

FOREIGN PATENT DOCUMENTS

| | | |
|---|---|---|
| DE | 40 16 486 A1 | 11/1991 |
| DE | 297 09 829 | 7/1997 |
| DE | 200 02 201 | 4/2000 |
| EP | 0 458 042 | 11/1991 |

OTHER PUBLICATIONS

Notification Concerning Transmittal of International Preliminary Report, and Notification of Transmittal of Copies of Translation of the International Preliminary Report on Patentability of PCT/EP2007/053799, dated May 5, 2006 along with English Translation.

* cited by examiner

*Primary Examiner* — Jose V Chen
(74) *Attorney, Agent, or Firm* — Barnes & Thornburg LLP

(57) ABSTRACT

A connecting device for connecting at least one foot element to furniture includes a holding element adhesively bonded to the furniture, an intermediate piece connected to the holding element, and a mounting part, couplable to the at least one foot element. The mounting part is removably connected to the intermediate piece.

21 Claims, 10 Drawing Sheets

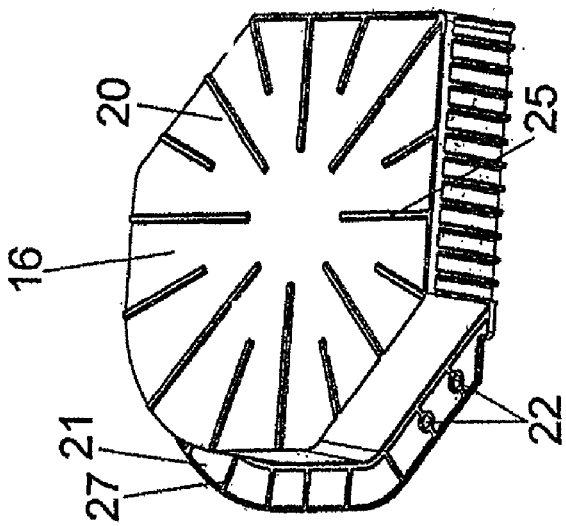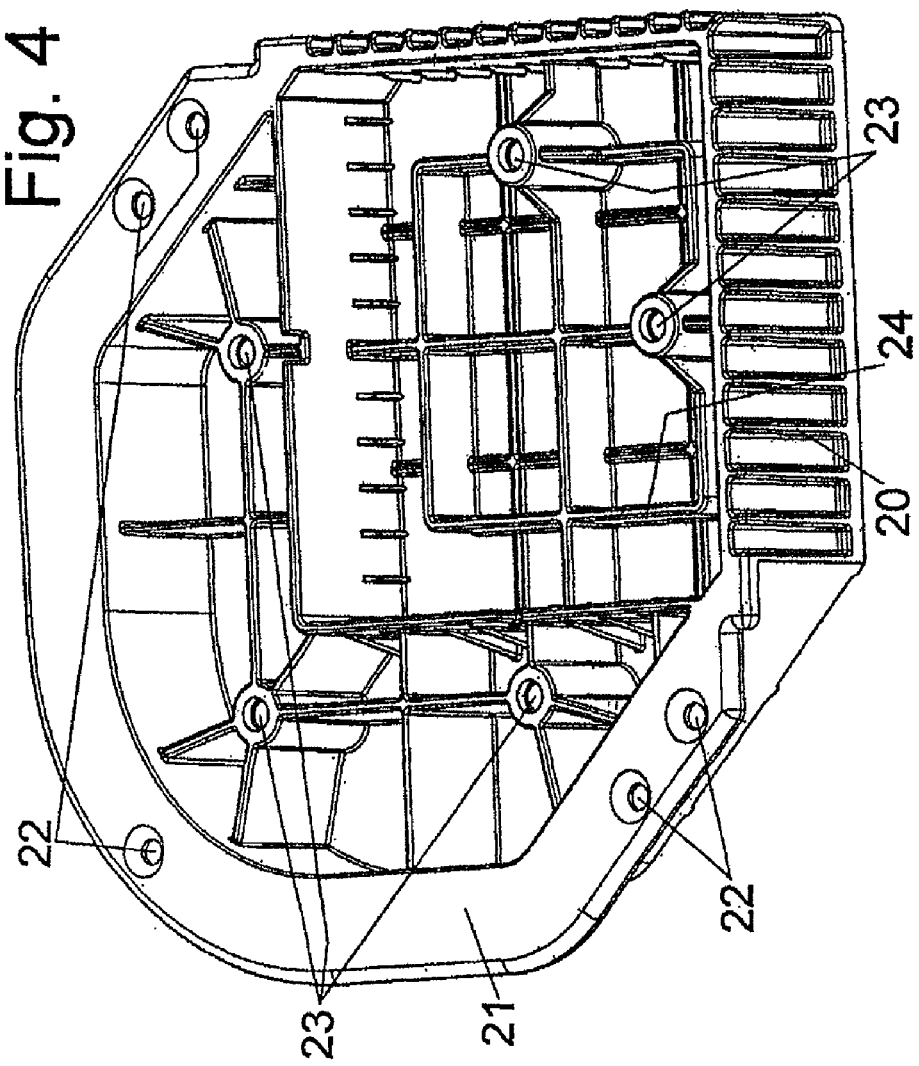

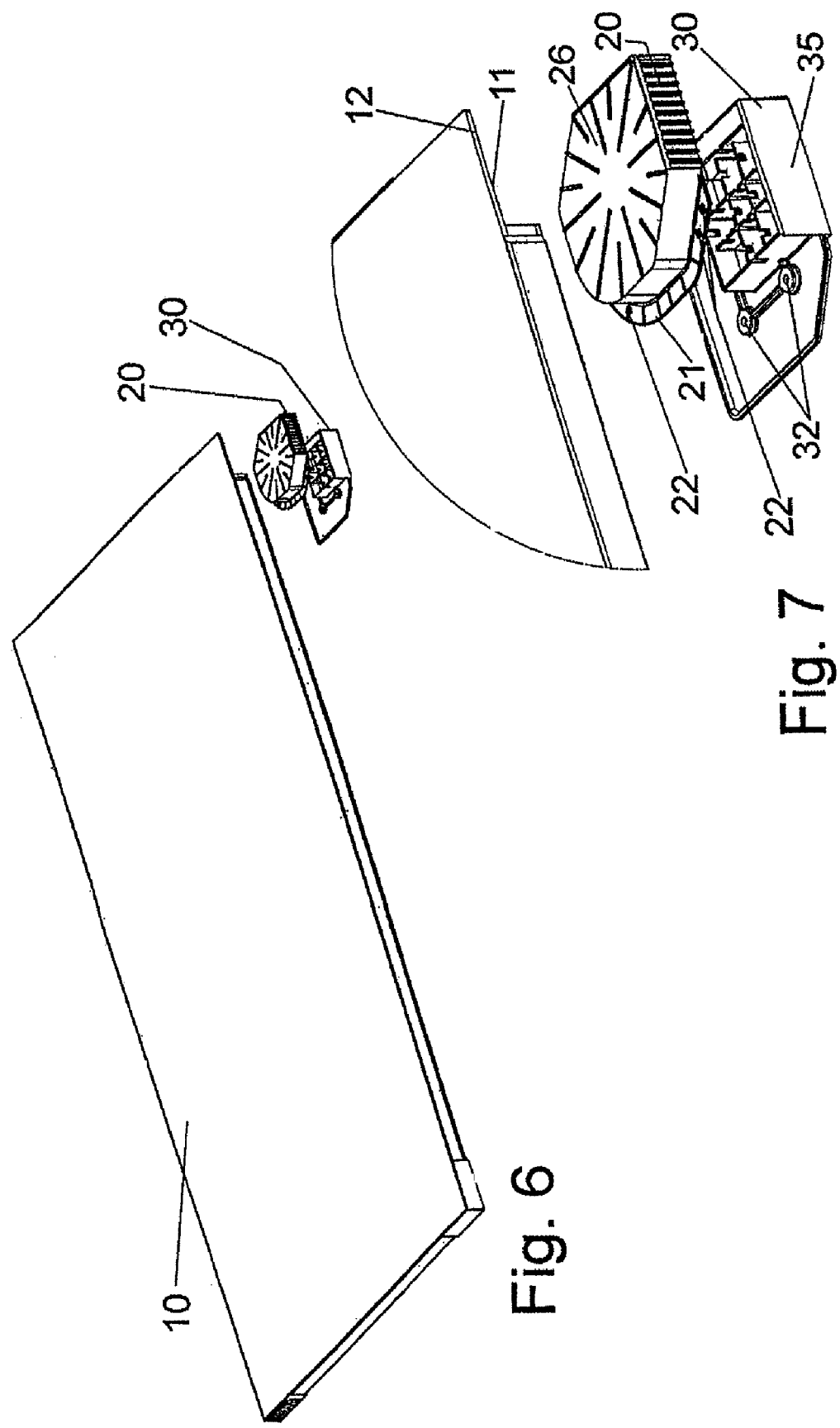

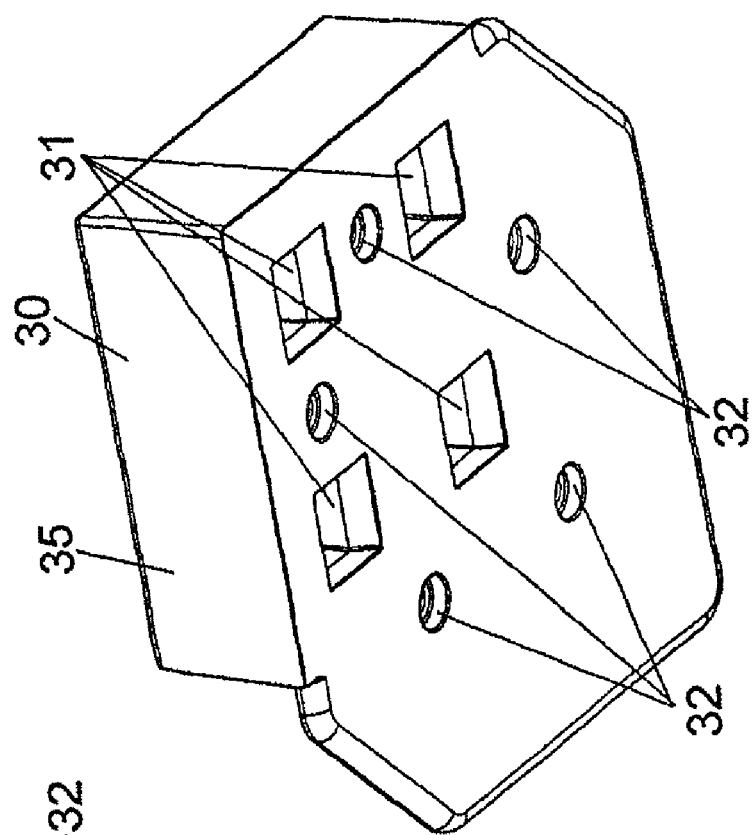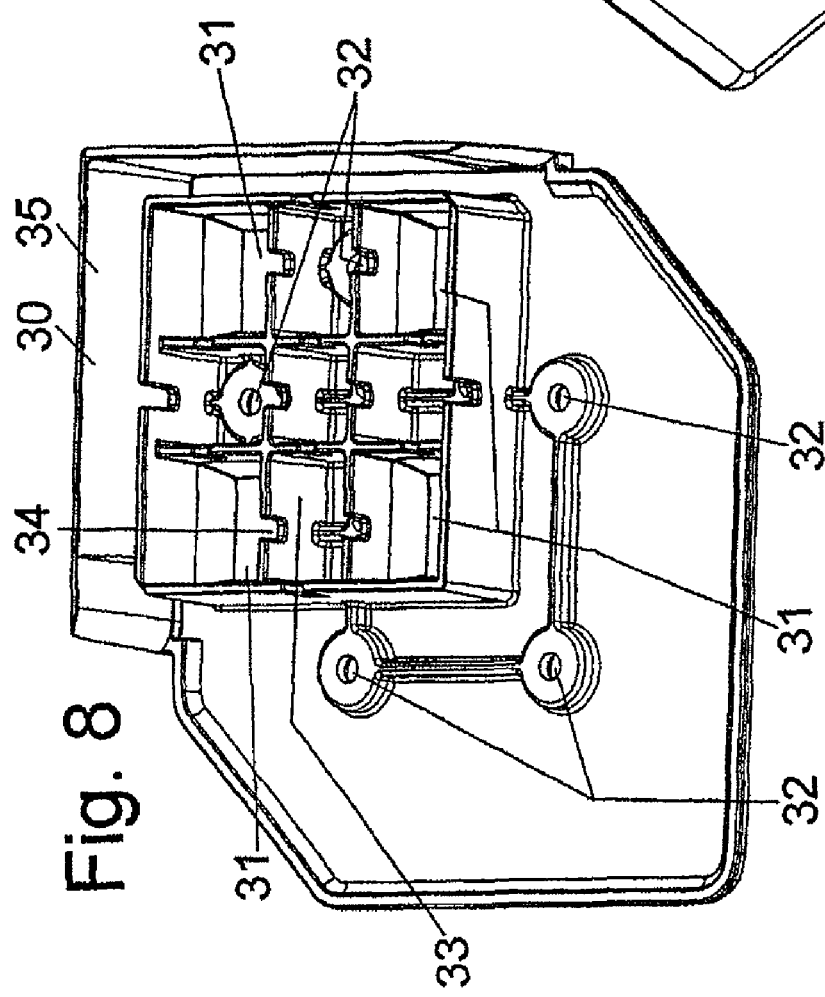

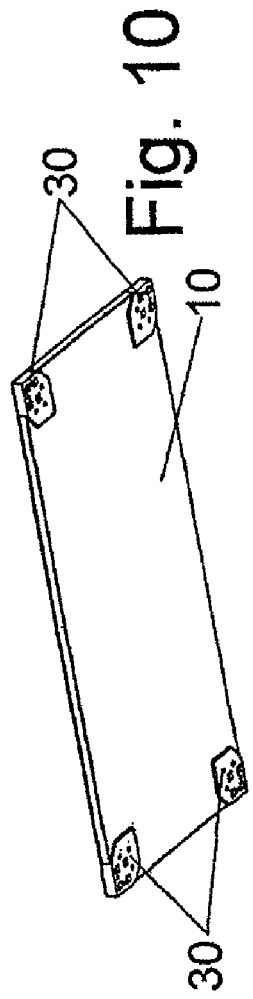
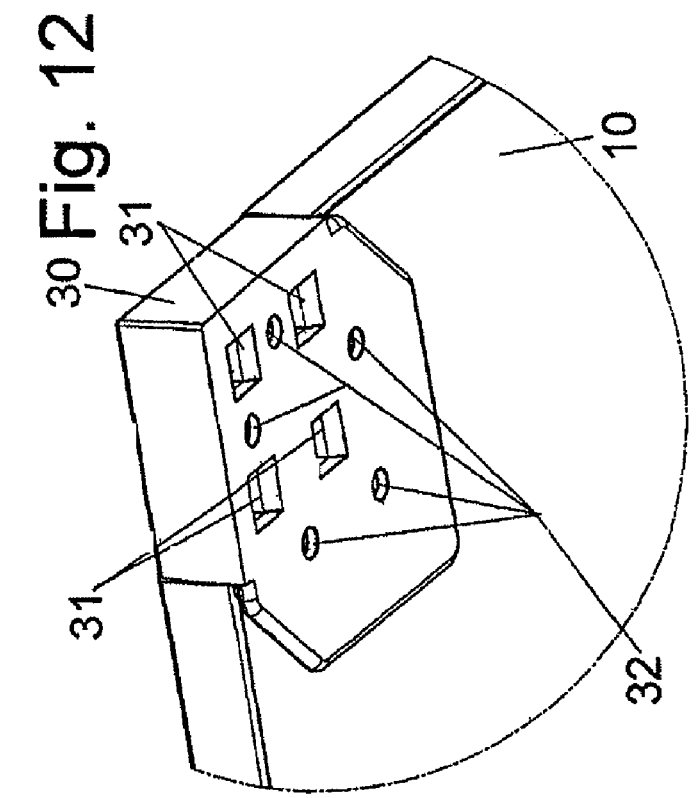
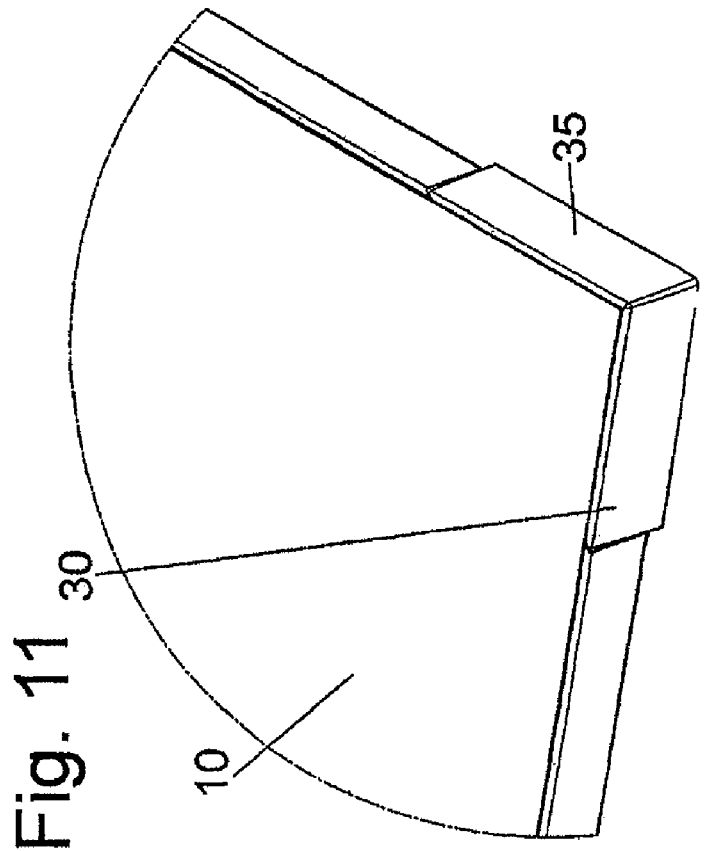

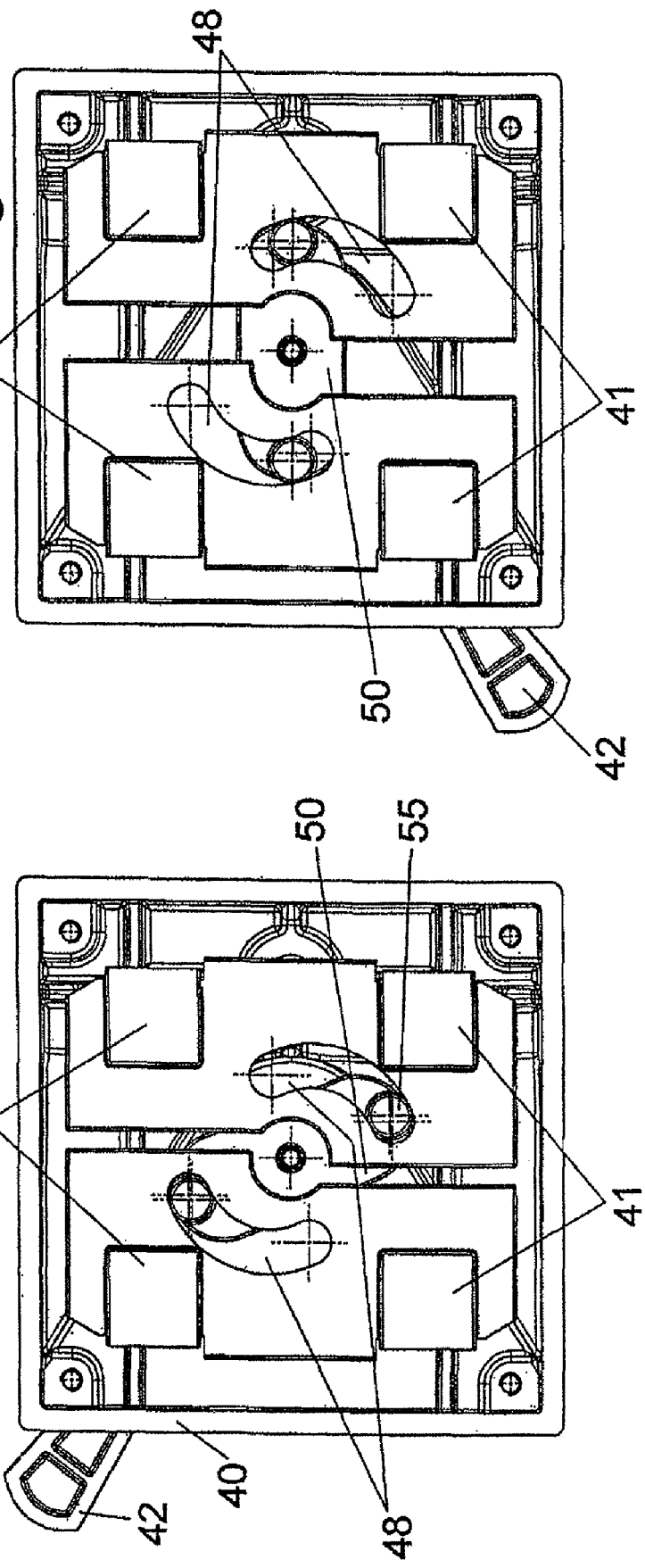

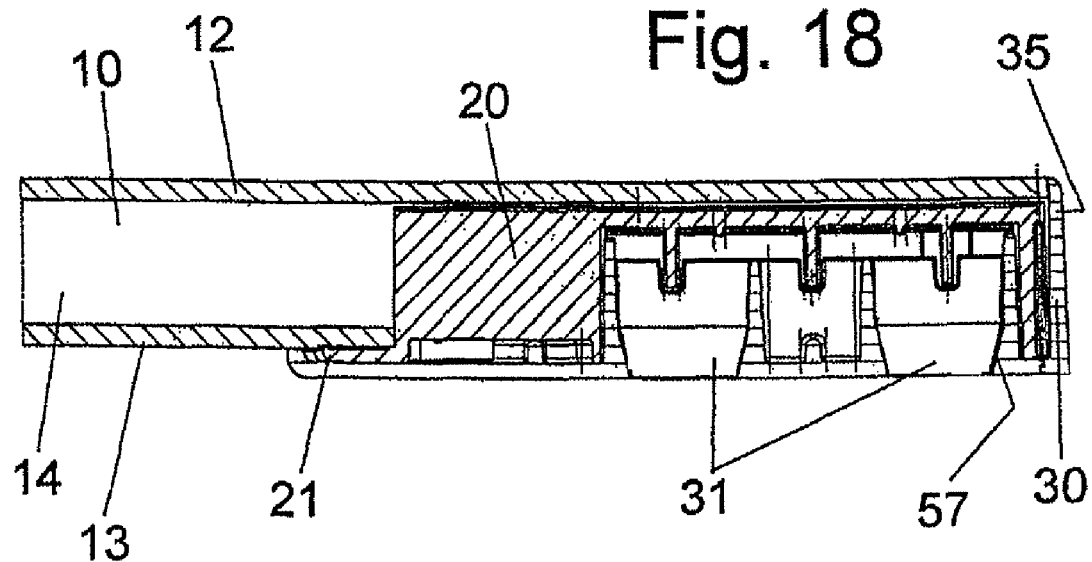
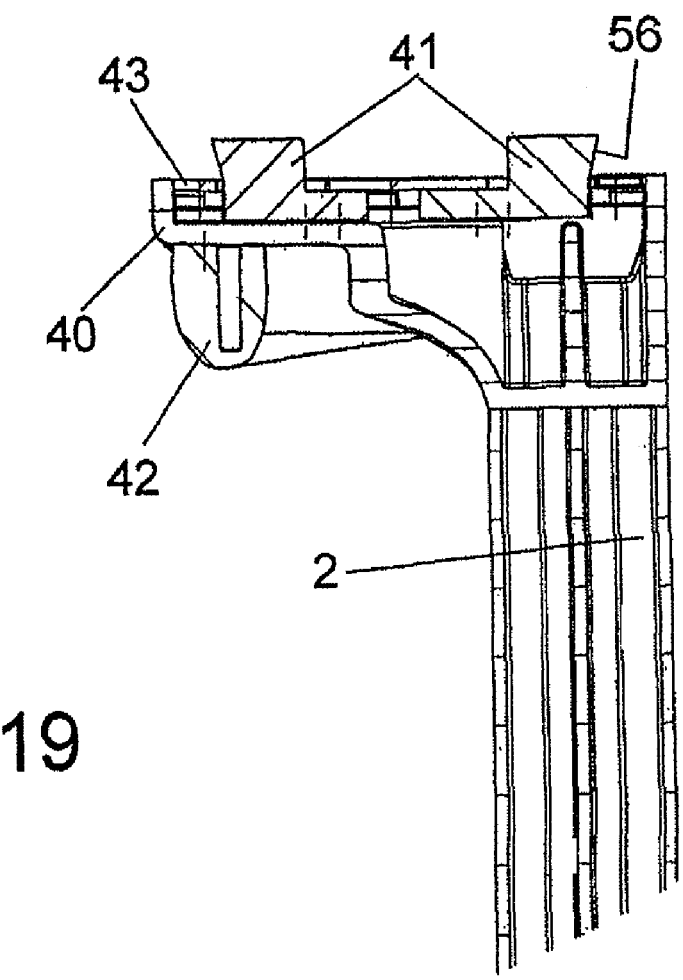

CONNECTING DEVICE FOR FURNITURE

CROSS-REFERENCE TO RELATED APPLICATION(S)

This is a National Stage U.S. Patent Application that relies for priority on International Patent Application No. PCT/EP2007/053799, filed on Apr. 18, 2007, and on German Patent Application No. DE 20 2006 007 300.00, which was filed on May 5, 2006, the contents of both of which are incorporated herein by reference.

FIELD OF THE INVENTION

The present invention relates to a connecting. More specifically, the present invention concerns a connecting device for furniture that may be employed to fasten table legs to furniture, for example.

DESCRIPTION OF RELATED ART

A connecting device for detachably fastening a table leg to a table plate is known from DE 40 16 486. The table leg is provided with projecting bolts that are inserted in bores. For the purpose of attaching the table leg by means of the bolts, a closing plate, on which there are realized receiving slots in which the bolts can be inserted, is swiveled. The bolts have a groove in which an edge of a clamping plate can be inserted in order that the table leg can no longer be removed from the table plate. A disadvantage with this design is the fastening of the connecting plate to the table plate by means of screw connections. Such screw connections have only a limited strength. In addition, screws only of a certain length may be used due to the construction of the table plates into which the screws are inserted. This type of fastening is not suitable for so-termed honeycomb plates, in which many cavities are provided in a middle or intermediate layer. In addition, it can happen that, in the case of more prolonged use, the bolts become slightly loose on the plate, such that the table leg can rock.

SUMMARY OF THE INVENTION

It is therefore the object of the present invention to create a connecting device for furniture that is easily mounted and affords a high degree of stability.

This object is achieved by means of a connecting device constructed in accordance with one or more of the embodiments of the present invention.

According to the invention, the connecting device comprises a holding element that is connected to a furniture plate, and a mounting part that can be coupled to a foot element, such as a table leg. The next aspect of the invention is that the holding element is adhesive-bonded to the furniture plate, and a metallic intermediate piece, on which the mounting part is mounted, is attached to the holding element. As a result, the connecting device can be used even in the case of furniture plates that are unsuitable for the fastening of screw connections, for example because the furniture plate is too thin or is of a multilayer structure and has a middle layer with numerous cavities in which screws have no hold. In addition, the holding element can be mounted rapidly and easily on the furniture plate by adhesive bonding. The furniture plate can be supplied with the holding elements pre-mounted.

According to one embodiment of the invention, the holding element is inserted in a receiver of the furniture plate. As a result, the holding element can be attached in a particularly stable manner, especially with respect to tilting movements of a foot element. The holding element in this case is preferably realized in a dish shape, and there is realized at an edge, at least partially, a flange extending parallelwise in relation to a base, the holding element being adhesively bonded to the furniture plate at the base and at the flange. As a result, adhesive bonding can be effected at differing levels, which increases the strength.

For defined attachment of the holding element, webs are preferably formed onto the base, such that receivers (or receiving regions) for adhesive are realized between the base and an adjacent surface of the furniture plate. The adhesive can then spread out at the location or the receivers (or receiving regions) and provide for a precisely fitting connection.

For simplicity of mounting, profilings that can be coupled to profile elements on the intermediate piece are realized on the base, on the side facing towards the intermediate piece. In this case, the intermediate piece can be fixedly clamped to the holding element, by means of the profile elements and the profiling, for the purpose of pre-fixing, which simplifies mounting. After pre-fixing, if required or desired, mechanical attachment can be effected, for example, by means of screws.

The holding element can be produced from plastic, such that adhesive-bonded joints can be produced easily.

According to a further contemplated embodiment of the invention, at least one projecting edge is realized, as edge protection for the furniture plate, on the metallic intermediate piece. This is because it is precisely in the corner region that the furniture plate can easily become damaged, such that protection by a metallic edge can prolong the service life of the furniture.

In one contemplated embodiment, the furniture plate is realized as a honeycomb plate, in which an intermediate layer of honeycomb form, comprising a multiplicity of cavities, is realized between two plates. As a result, the furniture plate, while being of low weight, can also be comparatively thick, which provides for a visually attractive appearance. In this embodiment, the base of the holding element can be adhesive-bonded to the first plate of the honeycomb plate, and the flange of the holding element can be adhesive-bonded to the second plate of the honeycomb plate.

According to a further contemplated embodiment of the invention, the mounting part has clamping elements, which are displaceable, via a curved guide, for a clamping attachment to the furniture. As a result, the mounting part can be attached in a durably stable manner, the clamping-on of the clamping elements preventing rocking of a foot element, for examples of a table leg.

According to another embodiment, mounted on the mounting part is a pivotable lever, by means of which the clamping elements are displaceable. As a result, the mounting part can be fitted to the foot element without the use of tools.

In still another contemplated embodiment, the clamping elements are realized as projecting blocks that engage in receivers. The blocks in this case can be provided with a bevel, at least on one side, which widens towards the end. As a result, in attachment of the mounting part, it is also possible to ensure protection against the mounting part being pulled out of the receivers.

According to a further embodiment of the invention, the mounting part can be attached to a metallic intermediate piece, which is attached to the holding element.

BRIEF DESCRIPTION OF THE DRAWINGS

The invention is explained more fully in the following with reference to one or more embodiments and the appended drawings, wherein:

FIGS. 4 and 5 show two perspective views of the holding element of the connecting device;

FIG. 6 shows a perspective view of the connecting device prior to mounting;

FIG. 7 shows a detailed view of the connecting device of FIG. 6;

FIGS. 8 and 9 show two perspective views of the intermediate piece of the connecting device;

FIGS. 10, 11 and 12 show three views of a furniture plate with a mounted intermediate piece of the connecting device; and FIGS. 13-19 provide a plurality of views of the mounting part of the connecting device.

DESCRIPTION OF EMBODIMENT(S) OF THE INVENTION

Figure 1:
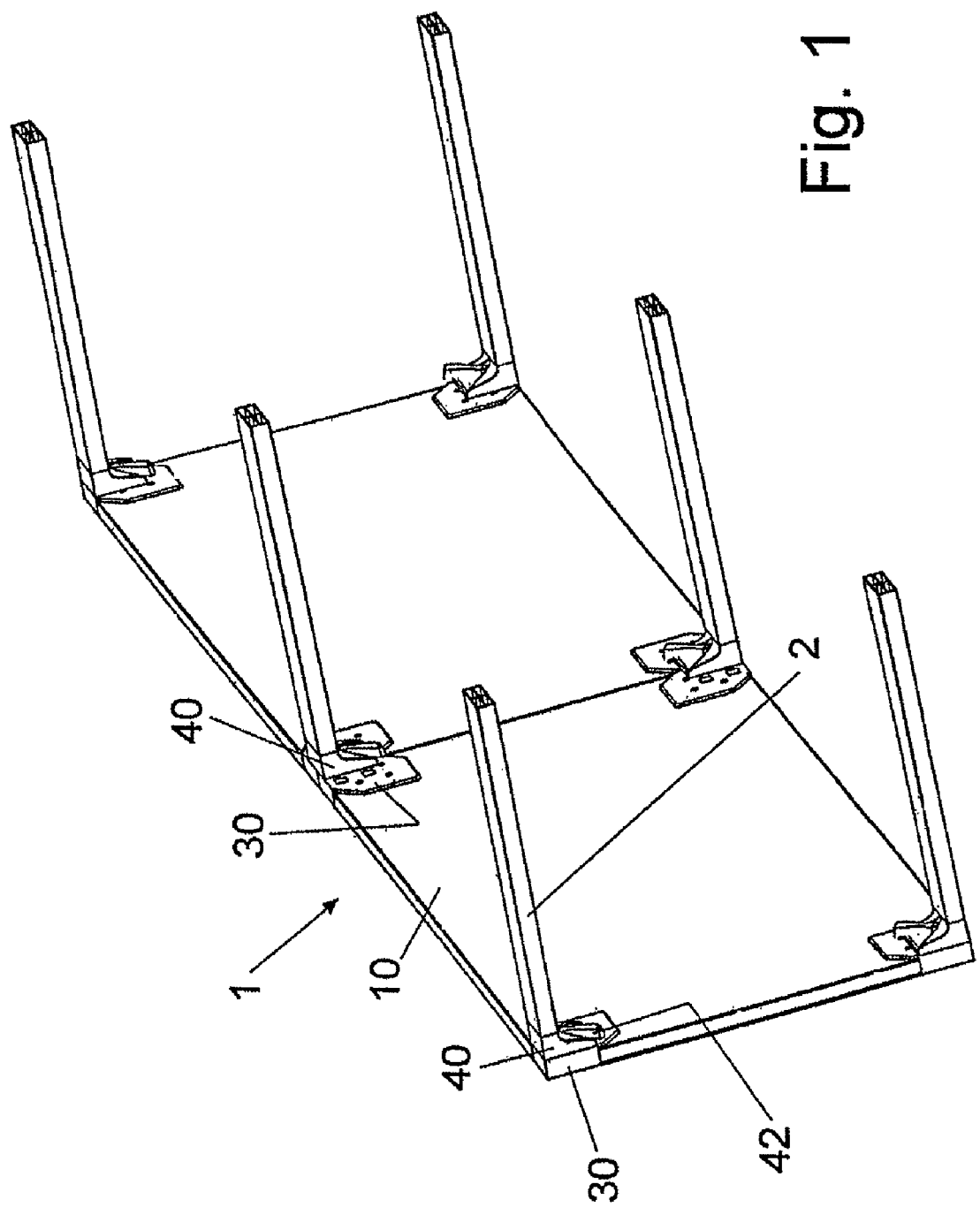
FIG. 1 shows a perspective view of connecting devices, which are shown in the mounted state.

While the present invention is described in connection with one or more embodiments, it is intended for the embodiment(s) to be representative of the scope of the invention and, therefore, not limiting of the invention. As should be appreciated by those skilled in the art, although not specifically discussed, there are numerous equivalents and variations that are also intended to be encompassed by the present invention.

A connecting device for furniture, in particular for tables 1, serves for mounting foot elements 2, such as table legs. The connecting device is attached to a furniture plate 10, and comprises a holding element 20, a metallic intermediate piece 30 and a mounting part 40. The foot element 2 can be attached to the mounting part 40. In one examples the foot element 2 can be realized as a hollow profile and fixed to the mounting part 40.

Figure 2:
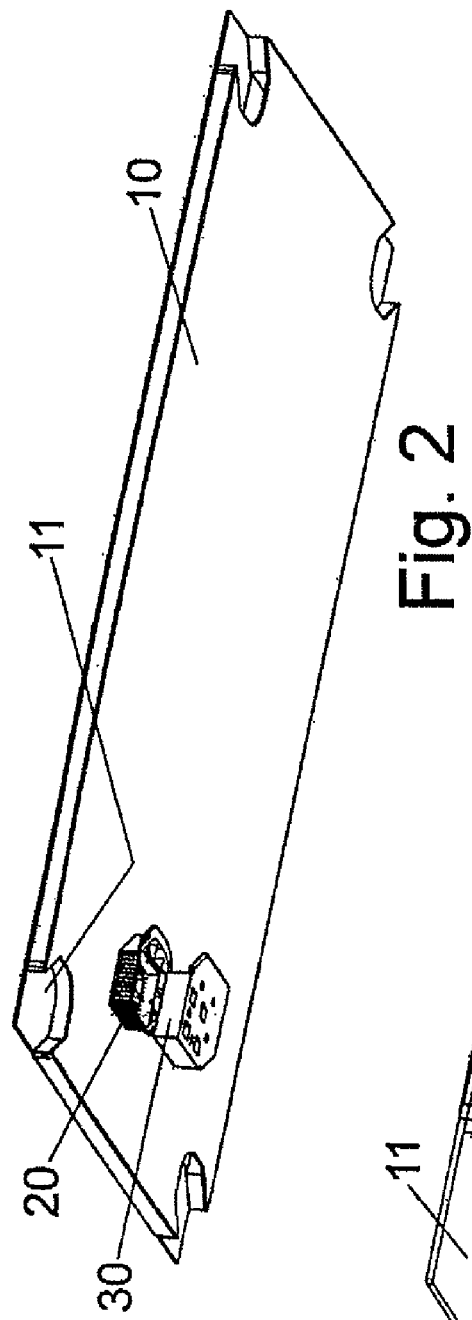
FIG. 2 shows a perspective exploded representation of a portion of the connecting device, prior to mounting.
Figure 3:
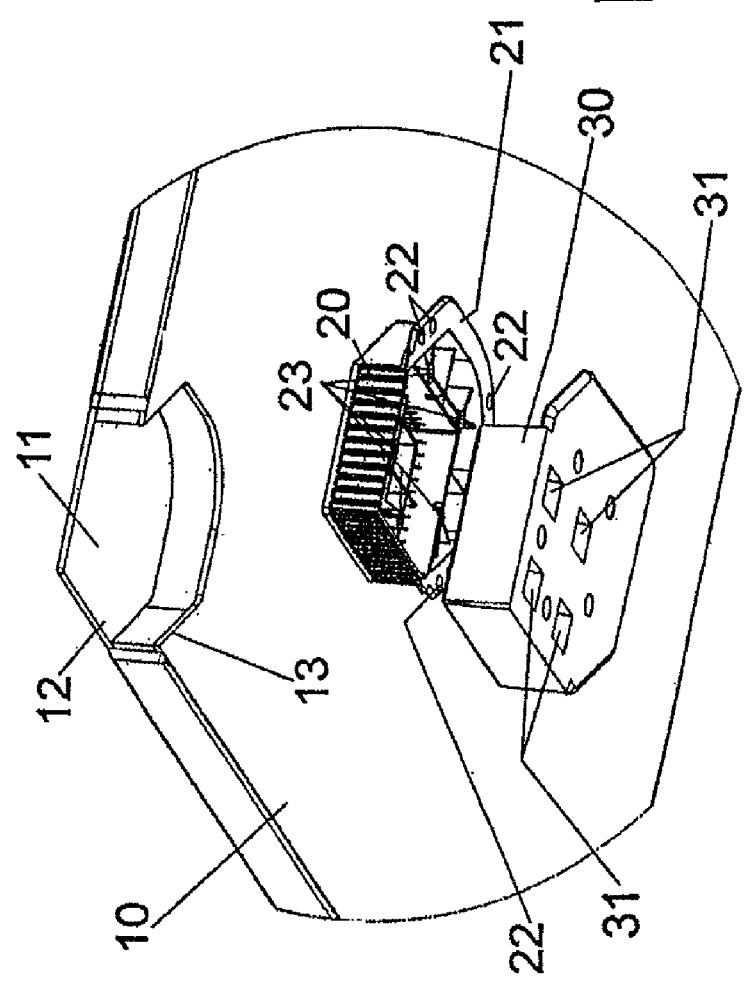
FIG. 3 shows a detailed view of the connecting device of FIG. 2.
Figure 14:
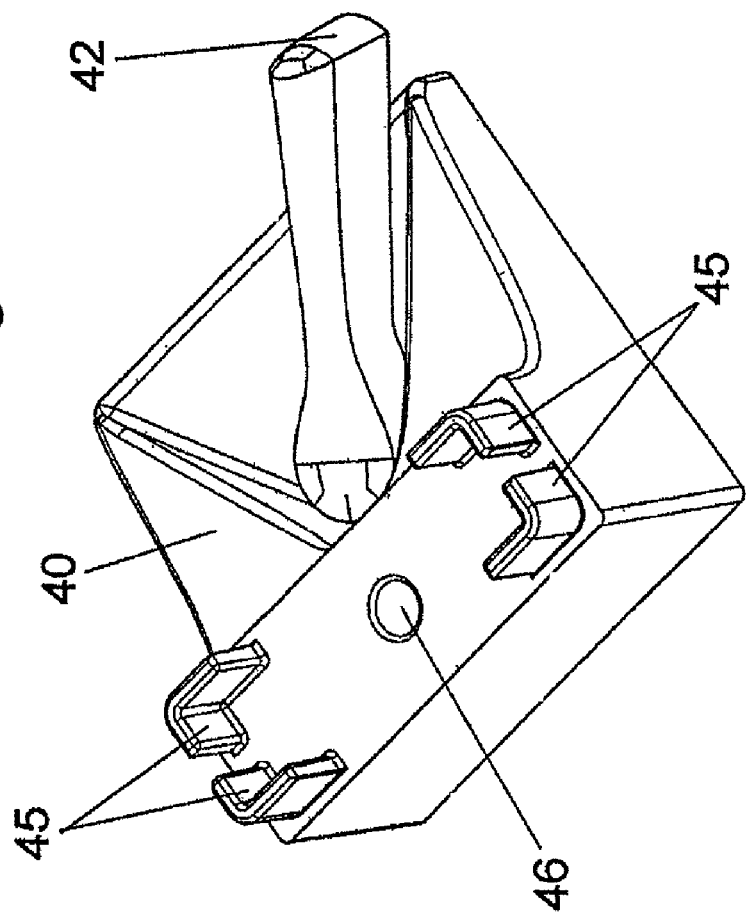
Figure 13:
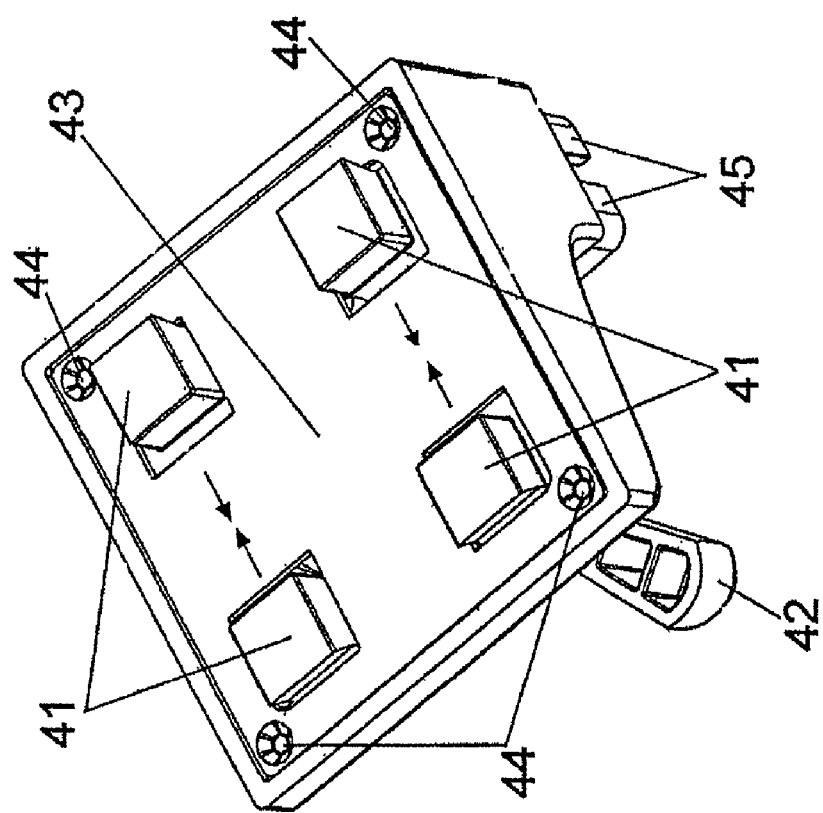

As can be seen in FIGS. 2 and 3, the holding element 20 is attached to the furniture plate 10. In this embodiment, a receiver 11 is positioned respectively in each of the corner regions, on the furniture plate 10. The furniture plate 10 is realized as a honeycomb plate and comprises a first continuous plate 12 and a second continuous plate 13, between which is arranged a honeycomb plate 14 (see FIG. 18, for example). The honeycomb plate 14 includes a multiplicity of cavities, as should be understood by those skilled in the art. Due at least in part to the use of the honeycomb plate 14, the furniture plate 10 can be given a greater thickness, but with only a low inherent weight. The receiver 11 is defined, at least in part, by the upper plate 12, which projects in the corner region, the lower plate 13 and the intermediate layer 14. As illustrated in FIG. 3, for example, the receiver 11 is defined, at least in part, by cut away portions of the lower plate 13 and the intermediate layer 14 in the corner region.

The holding element 20 is preferably made of plastic, and is adhesive-bonded to the furniture plate 10. The holding element 20 is realized in a dish shape, and comprises a base 26, which can be adhesive-bonded firmly to the plate 12. The holding element 20 also includes a projecting flange 21, in which screw openings 22 are provided. Further realized on the holding element 20, in an inner region on the side facing towards an intermediate piece 30, are webs with screw channels 23. The webs with screw channels 23 are aligned with openings 32 (see, e.g., FIG. 9) on the intermediate piece 30, such that it is possible for the intermediate piece 30 to be screwed onto the holding element 20. The intermediate piece 30 further has rectangular receivers 31, which serve for connection to the mounting part 40.

The holding element 20 is represented in detail in FIGS. 4 and 5. Webs 25, of a thickness of approximately 0.2-0.8 mm, preferably 0.5 mm, are realized on the base 26 of the holding element 20, such that the surface of the base 26 is arranged with a small clearance in relation to the plate 11. Receivers (i.e., receiving regions) for adhesive are thus provided between the webs 25. There are correspondingly arranged on the flange 21 webs 27. The webs 27 provide a small clearance between the plate 13 and the flange 21. This clearance permits the flange 21 to be adhesive-bonded securely to the plate 13. In addition, screws can then also be mounted on the flange 21, for the purpose of securing the holding element 20 in the receiver 11.

Further realized on the holding element 20, in an inner region on the side facing towards the intermediate piece 30, are webs 24 that serve, on the one hand, for reinforcement, and, on the other hand, for connection to the intermediate piece.

FIGS. 6 and 7 show a mounting installation of the connecting device. The holding element 20 is adhesive-bonded to the plate 12 by means of the base 26 and adhesive-bonded to the plate 13 by means of the flange 21. The metallic intermediate piece 30 is then pushed on (i.e., press-fitted) such that the webs 24 are able to be connected to corresponding profile elements of the intermediate piece 30. The intermediate piece 30 further has an edge 35, which is arranged approximately perpendicularly in relation to the furniture plate 10. The edge constitutes an edge protection, the height of the edge 35 corresponding approximately to the thickness of the furniture plate 10.

As shown in FIGS. 8 and 9, the metallic intermediate piece 30, on the side facing towards the holding element 20, likewise comprises webs 33 (or profile elements), on which grooves 34 are recessed. The webs 24 of the holding element 20 can be inserted in the grooves 34 in a clamping manner. Further, leadthroughs 32 for screws are realized on the intermediate piece 30, such that the intermediate piece 30 can be fixed firmly to the holding element 20.

Shown in FIGS. 10-12 is a furniture plate 10, at the four corners of which there are attached, respectively, a holding element 20 and an intermediate piece 30. The intermediate piece 30 has a respective edge 35, which constitutes an edge protection in the region of the receiver 11 and thereby prevents damage in the corner region.

Represented in FIGS. 13-19 is the mounting part 40, which serves for mounting a foot element 2, for example a table leg.

The mounting part 40 comprises clamping elements 41 in the form of projecting blocks, which are arranged so as to be displaceable. The clamping elements 41 project from a plate 43 on which are realized recesses that are larger than the cross sections of the clamping elements 41. The clamping elements 41 are movable within the plate 43. The plate 43 can be attached, via screw openings 44, which are provided in a housing on which a lever 42 is pivotally mounted. Further realized on the housing are projections 45 that engage in cavities of a foot element 2, such that the foot element 2 can be attached in a clamping manner or by means of adhesive-bonded joints. Further, a screw opening 46 can also be provided in the housing, to render possible attachment by means of a threaded bolt.

Figure 15:
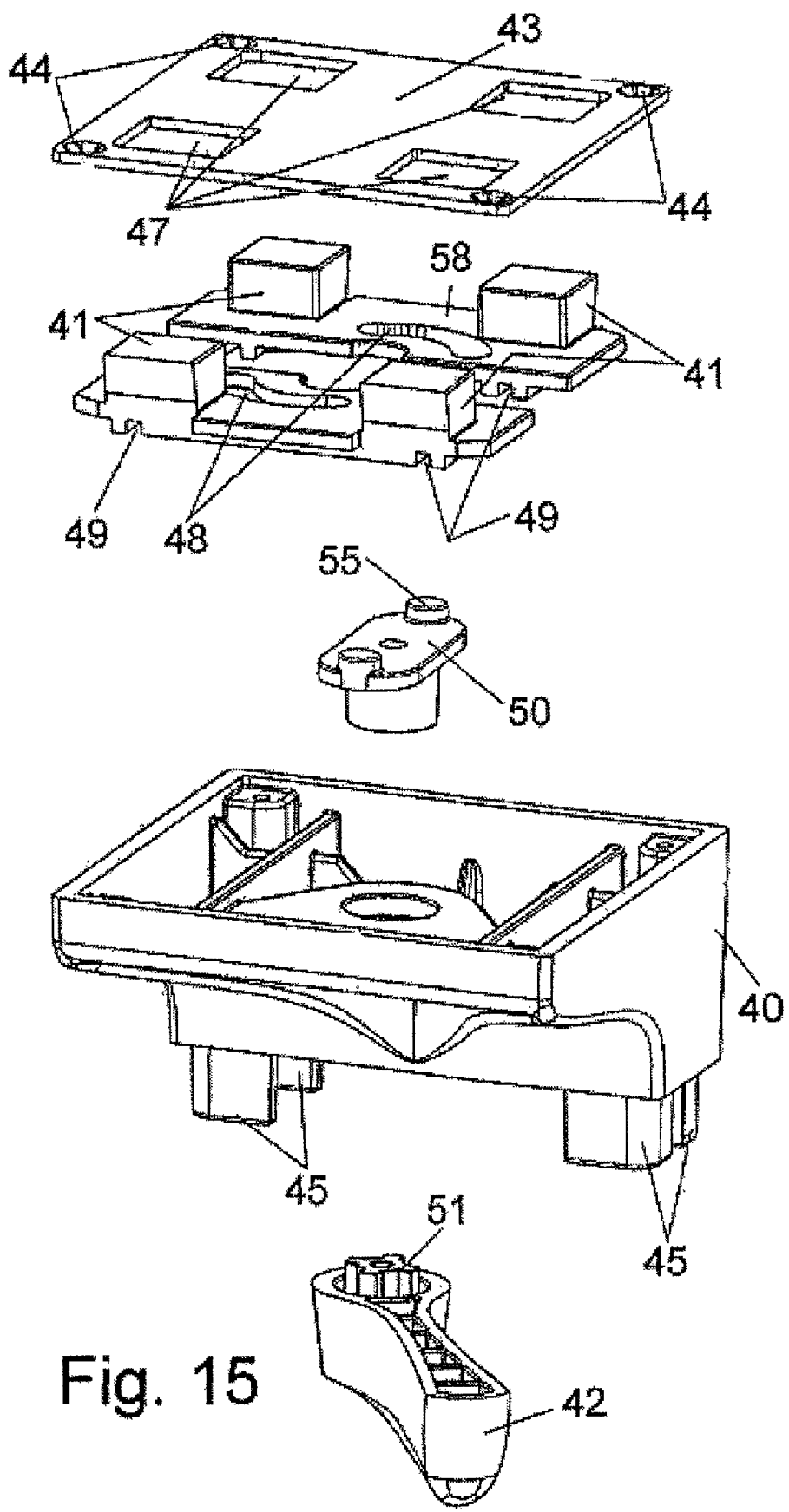

The clamping elements 41 are mounted so as to be displaceable via a curved guide as illustrated in FIGS. 15-17. The lever 42 is connected in a rotationally fixed manner, via a stud 51, to a rotary element 50. The rotary element 50 includes disk-shaped bolts 55. The bolts 55 engage in a groove-shaped curved guide 48, which is cut out in a plate 58 (see, e.g., FIG. 15), which includes two parts in the illustrated embodiment. Formed onto the plate 58 are clamping elements 41, which engage through openings 47 in the plate 43. A rotary movement of the lever 42, thus, causes the clamping elements 41 to be displaced. The clamping elements 41 are displaced by means of the curved guide 48 and the bolts 55. Two adjacent clamping elements 41, which are attached to the plates 58, are moved in opposing directions, respectively. The clamping elements 41 have a bevel 56, such that they widen towards the end. The receivers 31 on the metallic intermediate piece 30 likewise have a bevel 57, which corresponds with the bevel 56. When the clamping elements 41 have been inserted in the receivers 31, the lever 42 can be pivoted. As a result, the clamping elements 41 are moved outwards, such that a clamping attachment is effected. In this position, the foot element 2 can no longer be withdrawn from the receivers 31, owing to the bevels 56 and 57 (see, e.g., FIGS. 18 and 19). As also illustrated in FIG. 15, the plates 58 include grooves (or notches) 49 that engage (or are in register with) webs or profiles in the mounting part 40.

Four clamping elements 41 are provided in the exemplary embodiment shown. Clearly, it is also possible for only two clamping elements 41, or a different number of clamping elements 41, to be provided. The clamping elements 41 are moveable in two directions. Clearly, it is also possible for the clamping elements 41 to be moved, respectively, in the radial direction, in order to ensure clamping in a plurality of directions.

FIGS. 18 and 19 provide side views of the embodiment illustrated in FIGS. 15-17.

The invention claimed is:

1. A connecting device for connecting at least one foot element to furniture, comprising:
   a holding element adhesively bonded to the furniture;
   an intermediate piece connected to the holding element;
   a mounting part couplable, to the at least one foot element, removably connected to the intermediate piece; and
   wherein the base includes webs formed thereon to define a plurality of receiving regions for receiving an adhesive to bond the holding element to the furniture.

2. The connecting device of claim 1, wherein the at least one foot element is a furniture leg.

3. The connecting device of claim 1, wherein the intermediate piece comprises metal.

4. The connecting device of claim 1, wherein the holding element is positioned within a receiver in the furniture.

5. The connecting device of claim 1, wherein the holding element is dish-shaped and defines a base, an edge connected to the base, and a flange at least partially disposed along the edge, the flange being disposed parallel to the base, and
   wherein the holding element is adhesively bonded to the furniture via the base and the flange.

6. The connecting device of claim 1, wherein the holding element comprises plastic.

7. The connecting device of claim 1, wherein the intermediate piece includes at least one projecting edge that defines an edge protector for the furniture.

8. The connecting device of claim 1, wherein the furniture comprises:
   a first plate;
   a second plate; and
   an intermediate plate comprising a honeycomb material that is disposed between the first plate and the second plate.

9. The connecting device of claim 1, wherein the base is adhesively bonded to the first plate and the flange is adhesively bonded to the second plate.

10. A connecting device for connecting at least one foot element to furniture, the connecting device comprising:
    a holding element adhesively bonded to the furniture, the furniture including a first plate, a second plate, and an intermediate plate including a honeycomb material that is disposed between the first plate and the second plate;
    an intermediate piece connected to the holding element;
    a mounting part couplable to the at least one foot element and removably connected to the intermediate piece;
    wherein the holding element is dish-shaped and includes a base, an edge connected to the base, and a flange at least partially disposed along the edge, the flange being disposed parallel to the base; and
    wherein the base is adhesively bonded to the first plate and the flange is adhesively bonded to the second plate.

11. The connecting device of claim 10, wherein the base includes webs formed thereon to define a plurality of receiving regions for receiving an adhesive to bond the holding element to the furniture.

12. The connecting device of claim 10, wherein the base and the intermediate piece each include first and second profile elements that are engageable with one another.

13. The connecting device of claim 10, wherein the mounting part comprises:
    a plurality of clamping elements;
    a curved guide;
    a lever operatively connected to a rotary element having bolts movable in the curved guide; and
    wherein movement of the lever moves the clamping elements so that the clamping elements connect to receivers of the intermediate part.

14. A connecting device for connecting at least one foot element to furniture, comprising:
    a holding element adhesively bonded to the furniture;
    an intermediate piece connected to the holding element;
    a mounting part, couplable to the at least one foot element, removably connected to the intermediate piece;
    wherein the holding element is dish-shaped and defines a base, an edge connected to the base, and a flange at least partially disposed along the edge, the flange being disposed parallel to the base;
    wherein the holding element is adhesively bonded to the furniture via the base and the flange; and
    wherein the base and the intermediate piece each include first and second profile elements that are engageable with one another.

15. The connecting device of claim 14, wherein the second profile element of the intermediate piece engages the first profile element of the base to fix the intermediate element to the base.

16. A connecting device for connecting at least one foot element to furniture, comprising:
    a holding element adhesively bonded to the furniture;
    an intermediate piece connected to the holding element;
    a mounting part, couplable to the at least one foot element, removably connected to the intermediate piece;
    a plurality of clamping elements;
    a curved guide;
    a lever operatively connected to a rotary element having bolts movable in the curved guide; and
    wherein movement of the lever moves the clamping elements so that the clamping elements connect to receivers of the intermediate part.

17. The connecting device of claim 10, wherein the mounting part further comprises:
 a lever operatively connected to the clamping elements to move the clamping elements.

18. The connecting device of claim 10, wherein the clamping elements are projecting blocks, and
 wherein the receivers are openings that receive the projecting blocks.

19. The connecting device of claim 18, wherein the projecting blocks are beveled such that the projecting blocks widen at an end received in the openings.

20. The connecting device of claim of claim 18, wherein the plurality of clamping elements comprise four clamping elements and the openings comprise four openings, one for each of the clamping elements.

21. The connecting device of claim 20, wherein the four clamping elements are arranged in first and second pairs that are moveable in opposing directions via the bolts movable in the curved guide.

* * * * *